(12) United States Patent
Quadri et al.

(10) Patent No.: US 9,380,468 B2
(45) Date of Patent: Jun. 28, 2016

(54) WIRELESS COMMUNICATION METHODS AND APPARATUS

(71) Applicant: Kabushiki Kaisha Toshiba, Tokyo (JP)

(72) Inventors: Sadia Quadri, Bristol (GB); Fengming Cao, Bristol (GB); Filippo Tosato, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 289 days.

(21) Appl. No.: 13/745,410

(22) Filed: Jan. 18, 2013

(65) Prior Publication Data

US 2013/0189931 A1 Jul. 25, 2013

(30) Foreign Application Priority Data

Jan. 20, 2012 (GB) .................................. 1201136.7

(51) Int. Cl.
*H04W 52/24* (2009.01)
*H04W 36/20* (2009.01)
*H04W 24/00* (2009.01)
*H04L 1/00* (2006.01)

(52) U.S. Cl.
CPC ............. *H04W 24/00* (2013.01); *H04L 1/0003* (2013.01); *H04L 1/0015* (2013.01); *H04W 52/243* (2013.01); *Y02B 60/50* (2013.01)

(58) Field of Classification Search
CPC combination set(s) only.
See application file for complete search history.

(56) References Cited

U.S. PATENT DOCUMENTS

| | | | |
|---|---|---|---|
| 7,890,060 B2 * | 2/2011 | Lehtinen .................... 455/67.11 |
| 2002/0037729 A1 * | 3/2002 | Kitazawa et al. ............. 455/452 |
| 2002/0122413 A1 * | 9/2002 | Shoemake ..................... 370/349 |
| 2004/0246891 A1 * | 12/2004 | Kay et al. ..................... 370/215 |
| 2007/0133413 A1 * | 6/2007 | Pepperell ..................... 370/235 |
| 2008/0152051 A1 * | 6/2008 | Mada ............................ 375/345 |
| 2009/0042594 A1 * | 2/2009 | Yavuz et al. .................. 455/522 |
| 2010/0177721 A1 * | 7/2010 | Simonsson et al. ........... 370/329 |
| 2012/0142339 A1 * | 6/2012 | Duan .................... H04W 52/38 455/424 |
| 2012/0142364 A1 * | 6/2012 | Duan .................. H04W 72/082 455/450 |
| 2012/0224484 A1 * | 9/2012 | Babiarz et al. ................ 370/235 |
| 2013/0128796 A1 * | 5/2013 | Newberg et al. .............. 370/312 |

FOREIGN PATENT DOCUMENTS

| | | |
|---|---|---|
| EP | 1 434 364 A2 | 6/2004 |
| GB | 2 282 736 A | 4/1995 |
| GB | 2 390 953 A | 1/2004 |

(Continued)

OTHER PUBLICATIONS

Office Action issued Feb. 4, 2014, in Japanese Patent Application No. 2013-008309 with English translation.
UK Search Report issued May 17, 2012, in UK Application No. GB1201136.7, filed Jan. 20, 2012.
Gavin Holland et al. "A rate-Adaptive MAC Protocol for Multi-Hop Wireless Networks", ACM Mobicom, 2001, 15 pages.
Jongseok Kim et al. "CARA: Collision-Aware Rate Adaptation for IEEE 802.11 WLANs", IEEE Infocom, 2006 11 pages.

(Continued)

*Primary Examiner* — Cindy Trandai
(74) *Attorney, Agent, or Firm* — Oblon, McClelland, Maier & Neustadt, L.L.P.

(57) ABSTRACT

In one embodiment a method of identifying interference in a wireless network is disclosed. The wireless network comprises a first base station and a second base station. The method comprises detecting an increase in an error rate in a wireless connection between the first base station and a first wireless device; comparing a reference signal power received by the first wireless device from the first base station with a threshold value; and determining that the increase in error rate is due to interference from a wireless connection between the second base station and a second wireless device if the reference signal power is greater than the threshold.

16 Claims, 6 Drawing Sheets

(56) References Cited

FOREIGN PATENT DOCUMENTS

| GB | 2408420 A | * | 5/2005 |
| JP | 2000-341204 A | | 12/2000 |
| JP | 2003-23395 A | | 1/2003 |
| JP | 2003-244754 A | | 8/2003 |
| JP | 2011-97374 A | | 5/2011 |
| WO | WO 2009/131522 A1 | | 10/2009 |
| WO | WO 2011/004868 A1 | | 1/2011 |
| WO | WO 2011/150592 A1 | | 12/2011 |

OTHER PUBLICATIONS

Starsky H.Y. Wong et al. "Robust Rate Adaptation for 802.11 Wireless Networks", ACM Mobicom 2006, pp. 146-157.

Prashanth Aravinda Kumar Acharya et al. "Congestion-Aware Rate Adaptation in Wireless: A Measurement-Driven Approach", IEEE Secon, 2008, pp. 1-9.

Office Action issued on Nov. 18, 2014 in the corresponding Japanese Patent Application No. 2013-008309 (with English Translation).

* cited by examiner

WIRELESS COMMUNICATION METHODS AND APPARATUS

FIELD

Embodiments described herein relate to classifying loss in wireless networks and identifying interference loss in wireless networks.

BACKGROUND

Loss classification has been an interesting topic of research in wireless communications in general and has been researched extensively in wireless technologies that operate in the free spectrum.

Recently heterogeneous network topology has been developed to further exploit spatial diversity to enhance the coverage of traditional macrocells. Different types of cells i.e. macrocell, picocell, femtocell overlay in the same area. Two examples of heterogeneous networks are the coordinated antenna base station (CoAB) system and distributed antenna base station (DAB) system, where base stations are typically deployed in large indoor environments connecting a master unit (MU) or controller. A challenge for system design is the integration of these new systems within the new network topology because while they provide huge benefit to the system, there are some issues needed to be addressed. Once the conventional macrocell topology is extended to the heterogeneous network, interference emerges as a problem.

Many approaches have been proposed in the general context of differentiating between interference losses and channel losses. Conventionally for interference detection in LTE, there is no standard technique specified, at the same time it is also important to be able to differentiate between signal losses due to interference or channel.

BRIEF DESCRIPTION OF THE DRAWINGS

In the following, embodiments of the invention will be described with reference to the drawings in which.

DETAILED DESCRIPTION

Figure 1:
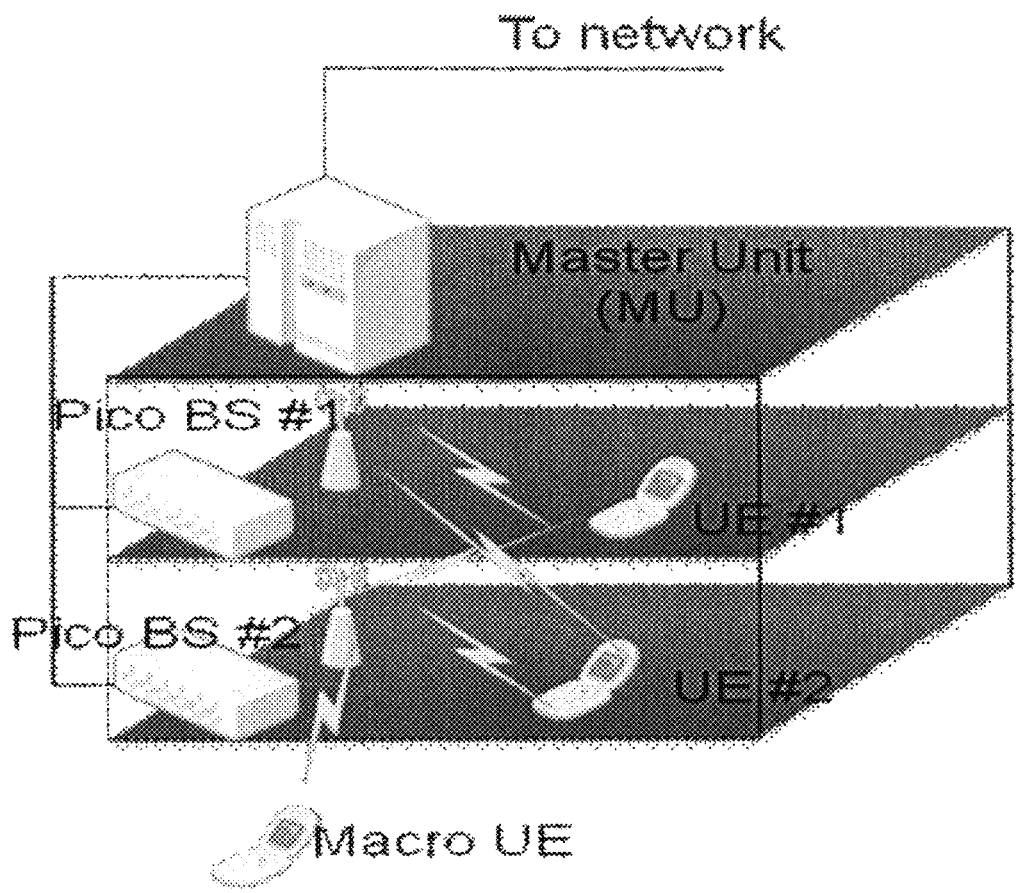
FIG. 1 shows an example of a distributed antenna base station system.

In one embodiment a method for identifying interference in a wireless network is disclosed. The wireless network comprises a first base station and a second base station. The method comprises: detecting an increase in an error rate in a wireless connection between the first base station and a first wireless device; comparing a reference signal power received by the first wireless device from the first base station with a threshold value; and determining that the increase in error rate is due to interference from a wireless connection between the second base station and a second wireless device if the reference signal power is greater than the threshold.

The method may further comprise determining that the increase in error rate is due to a change in channel conditions if the reference signal power is less than the threshold.

The method may further comprise decreasing a bit rate of the wireless connection between the first base station and the first wireless device if the increase in error rate is due to a change in channel conditions.

The method may further comprise reducing signal strength in the network if the increase in error rate is due to interference.

In one embodiment, reducing signal strength in the network comprises reducing the strength of the signals transmitted from the first base station and the second base station.

The method may further comprise checking if the an error rate in a wireless connection between the first base station and a first wireless device is below a target error rate following reducing the signal strength and further reducing the signal strength if the error rate is not below the threshold.

The method may further comprise checking if the an error rate in a wireless connection between the first base station and a first wireless device is below a target error rate following decreasing the bit rate and further decreasing the bit rate if the error rate is not below the threshold.

The threshold value may be dependent upon a value for the reference signal power prior to the wireless connection between the second base station and the second wireless device being established.

In one embodiment a wireless network comprises a first base station operable to connect wirelessly with a first wireless device, the first base station operable to output a reference signal and to receive from the first wireless device an indication of the strength of the reference signal power received at the first wireless device; a second base station operable to connect wirelessly with a second wireless device; and a controller operable to detect an increase in an error rate in a wireless connection between the first base station and the first wireless device; compare an indication of the strength of the reference signal power received at the first wireless device with a threshold value; and determine that the increase in error rate is due to interference from a wireless connection between the second base station and the second wireless device if the reference signal power is greater than the threshold.

The controller may be operable to cause the first base station and/or the second base station to reduce the power of a transmitted signal if the increase in error rate is due to interference.

The controller may be operable to determine that the increase in error rate is due to a change in channel conditions if the reference signal power is less than the threshold.

The controller may be operable to decrease a bit rate of the wireless connection between the first base station and the first mobile device if the increase in error rate is due to a change in channel conditions.

In one embodiment a controller for controlling a first base station and a second base station in a wireless network is disclosed. The controller is configured to receive from the first base station an indication of an error rate in a signal sent from the first base station to a first wireless device and an indication of a reference signal power received by the first wireless device from the first base station; determine if the error rate has risen above an error rate threshold; compare the reference signal power received with a reference signal power threshold; and if the reference signal power received is greater than the reference signal power threshold determine that the increase in error rate is due to interference from a wireless connection between the second base station and a second wireless device.

The controller may be further configured to operable to cause the first base station and/or the second base station to reduce the power of a transmitted signal if the increase in error rate is due to interference.

The controller may be further operable to determine that the increase in error rate is due to a change in channel conditions if the reference signal power is less than the threshold.

The controller may be further operable to decrease a bit rate of the wireless connection between the first base station and the first mobile device if the increase in error rate is due to a change in channel conditions.

The controller may be further operable to cause the first base station and/or the second base station increase the power of a transmitted signal if the error rate is below the error rate threshold.

The controller may be further operable to increase a bit rate of the wireless connection between the first base station and the first mobile device if the error rate is below the error rate threshold.

In one embodiment a computer readable medium carrying computer executable instructions is disclosed. When the computer executable instructions are executed on a processor cause the processor to execute a method as described above.

FIG. 1 shows an example of a distributed antenna base station (DAB) system. Two pico cells within a macro cell are assumed to be deployed in a building to extend the in-building coverage and the pico BS#1 will impose interference to UE#2, who is served by the pico BS#2. Similarly, the pico BS#2 also impose interference to the UE#1 of the BS#1. At the same time, the pico BSs will have interferences to the macro UE. How to tackle the interference still remains of huge interest for the heterogeneous network.

Figure 2:
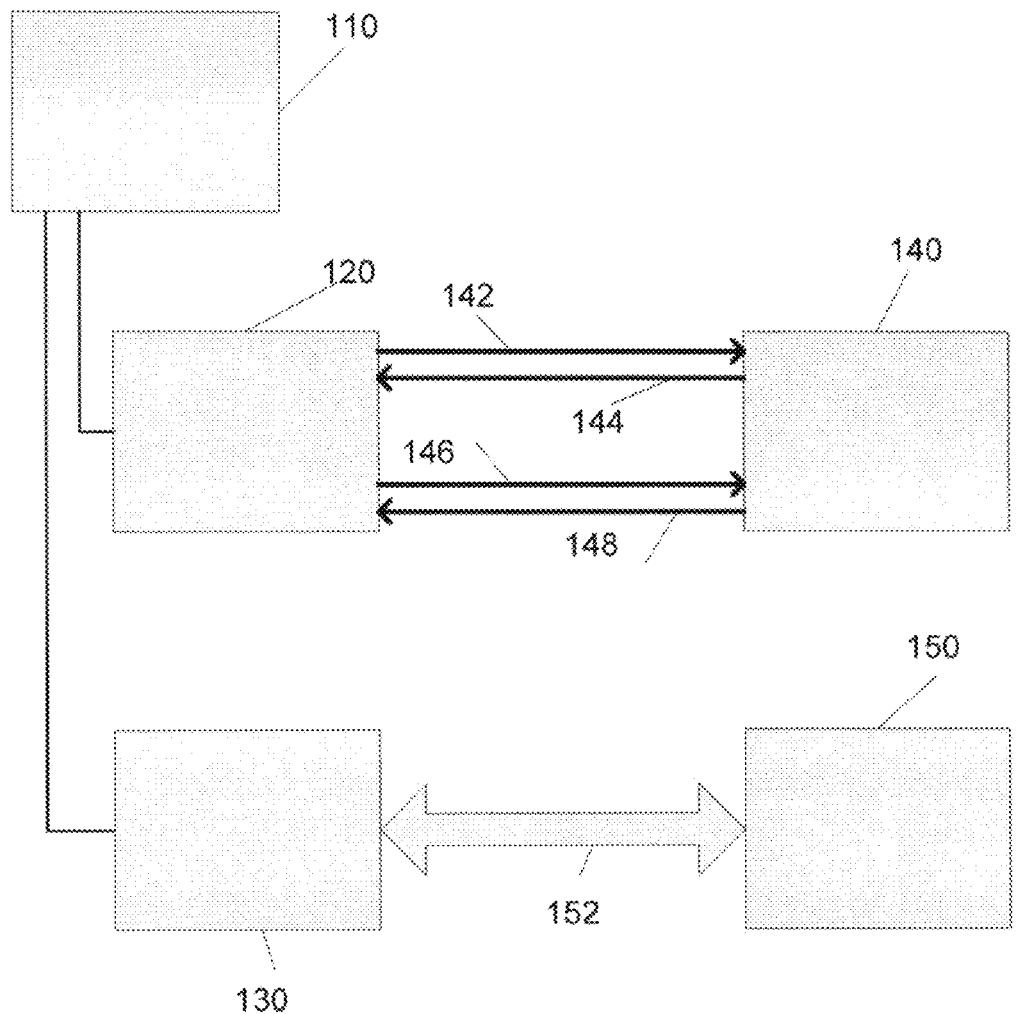
FIG. 2 shows a schematic of the network shown in FIG. 1.

FIG. 2 is a schematic of the network 100 shown in FIG. 1. Controller 110 is connected to a first base station 120 and a second base station 130.

The first base station 120 is connected by a wireless connection to a first wireless device 140. The first base station sends a reference signal 142 to the first wireless device. The first wireless device 140 measures the received power of the reference signal 142 and sends back a reference signal received power (RSRP) value 144 to the first base station 120. The first wireless device 140 sends the RSRP value 144 on request from the first base station 120, for example when the first base station 120 sends a radio resource control (RRC) connection request.

The first base station 120 sends data 146, for example, a video to be displayed, to the wireless device 140 as packets. The data 146 includes error checking data which is used by the first wireless device 140 to identify errors in the packets sent from the first base station 120. The first wireless device 140 sends acknowledgement data 148 back to the first base station 120 which indicates if packets have been received with errors. The first base station 120 uses the acknowledgement data 148 to calculate a error rate in the data 146 received by the first wireless device 140. The error rate is calculated as a packet error rate (PER) which is the ratio of the total number of packets received with errors/total packets sent and is calculated as a percentage.

The second base station 130 is located relatively close to the first base station 120. For example as shown in FIG. 1, the base stations may be located on different floors of the same building. Because of the proximity of the second base station 130 to the first base station 120, when the second base station 130 establishes a wireless connection with a second wireless device 150, the signals 152 sent between the second base station 130 and the second wireless device may interfere with the data 146 sent from the first base station 120 to the first wireless device 140.

However, an increase in the PER of the data 146 received by the first wireless device 140 could also be caused by changes in the channel conditions between the first base station 120 and the first wireless device 140.

Figure 3:
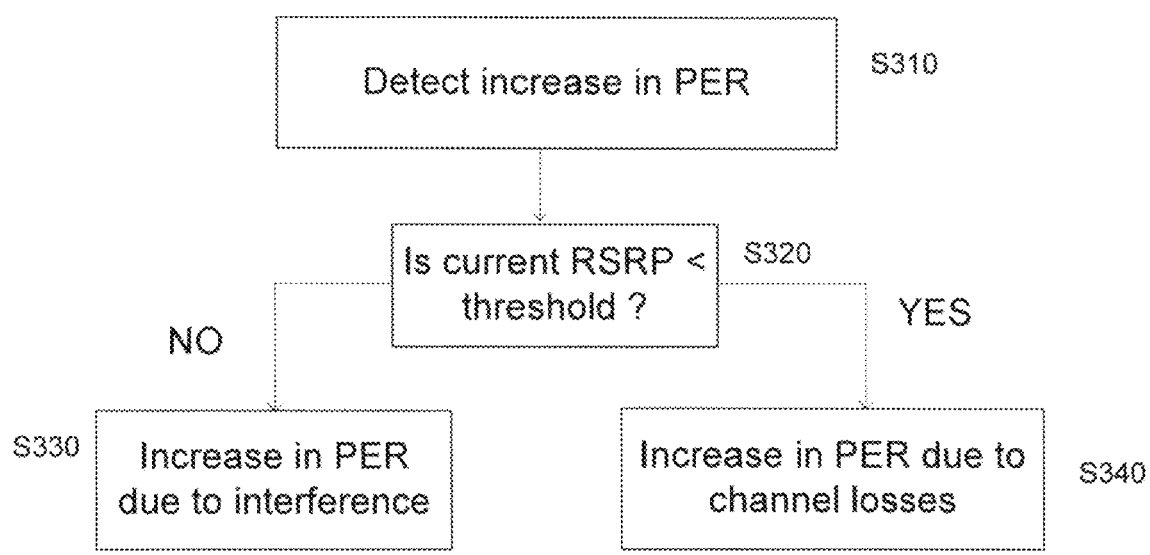
FIG. 3 is a flowchart showing illustrating a method of determining if an increase in error rate is due to interference.

FIG. 3 shows a method implemented by the controller 110 to determine whether an increase in the packet error rate (PER) calculated by the first base station 120 is due to interference from the signal 152 transmitted between the second base station 130 and the second wireless device 150 or due to a change in channel conditions.

In step S310, an increase in the error rate in the wireless connection between the first base station 120 and the first wireless device is detected. In S320, the RSRP of the connection between the first base station 120 and the first wireless device 140 is compared with a threshold. The threshold is based on the RSRP before the change in BER. If the RSRP is above the threshold, then it is determined in step S330 that the increase is due to interference. If the RSRP is below the threshold, then it is determined in step S340 that the increase in error rate is due to channel losses.

The reference signal 142 is sent orthogonal to the data 146. This means that if there is interference from the signal 152 transmitted between the second base station and the second wireless device 150, there will be only a small change in the RSRP detected by the first wireless device 140.

However when there is a bad channel it affects all the frequencies hence the RSRP detected by the first wireless device 140 will be reduced. The first wireless device 140 measures the RSRP and reports to the controller 110 via the first base station 120 upon request. The controller 110 uses this RSRP value to identify if interferers are present. If there is interference, the received power will stay approximately the same but there will be a higher error rate. If the channel conditions get worse, then the received power will decrease.

Figure 4:
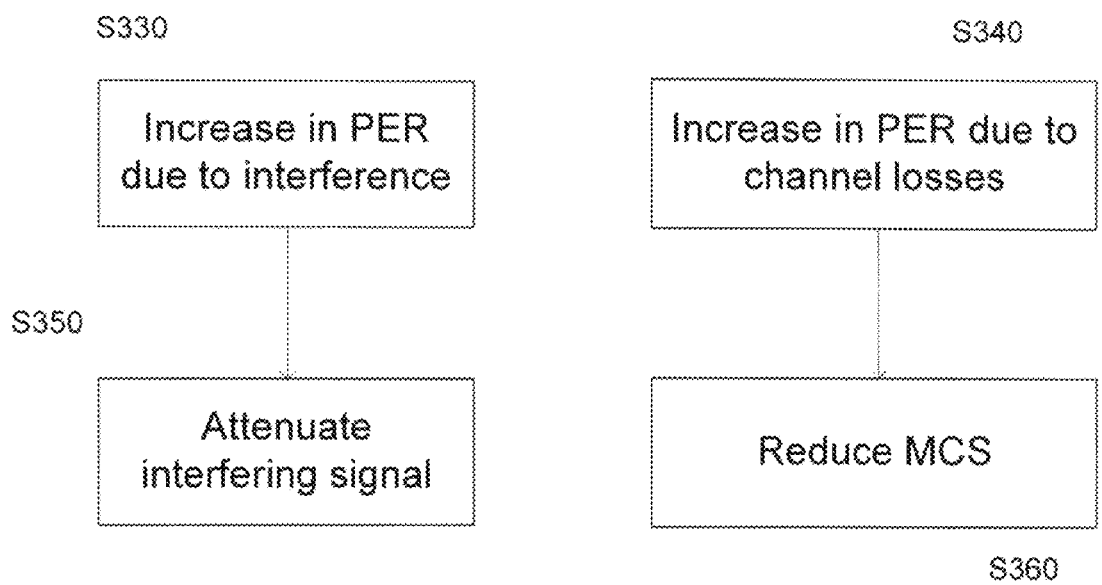
FIG. 4 is a flowchart showing a method of decreasing error rate based on the result of the method shown in FIG. 3.

FIG. 4 shows the steps taken by the controller 110 once it has determined whether the increase in BER is due to interference or channel losses. If in step S330, the increase in BER is due to interference, then in step S350, the controller 110 causes the second base station 130 to reduce the signal 152 which is interfering with the data sent between the first base station 120 and the first wireless device 140 up to a certain threshold.

If interference is present and the systems PER (Packet Error Rate) rises above 10% then a downlink power control mechanism is triggered. This may lower the power of both the base station interfering and being interfered is lowered such that the interference is avoided.

If in step S340, the increase in PER is due to channel losses, then in step S360, the controller 110 causes the first base station 120 to reduce the modulation coding scheme (MCS) to improve the link quality. Reducing the MCS has the effect of reducing the bit rate of the wireless connection.

Figure 5:
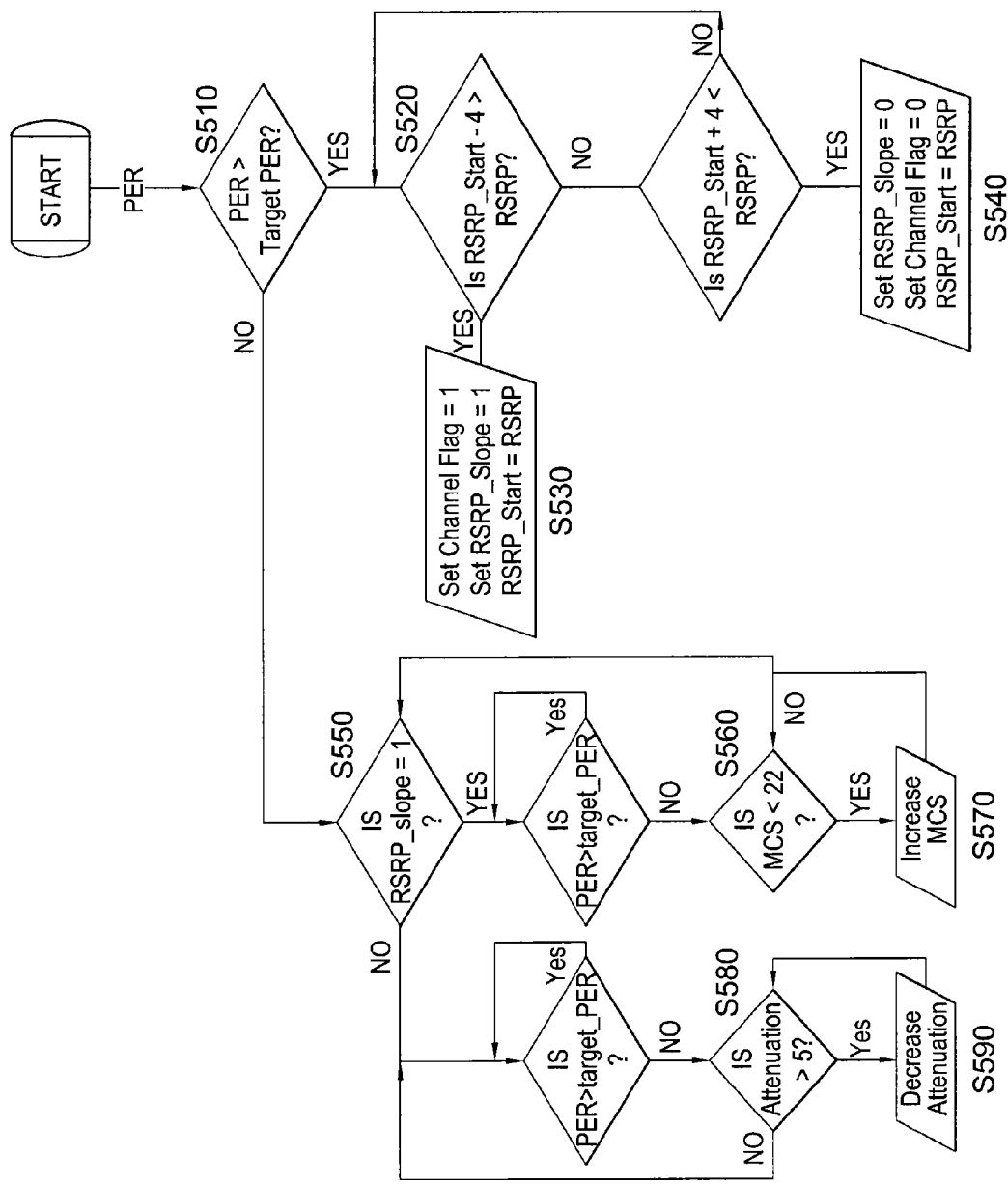
FIGS. 5 and 6 are flowcharts showing a method of controlling base stations in a network.
Figure 6:
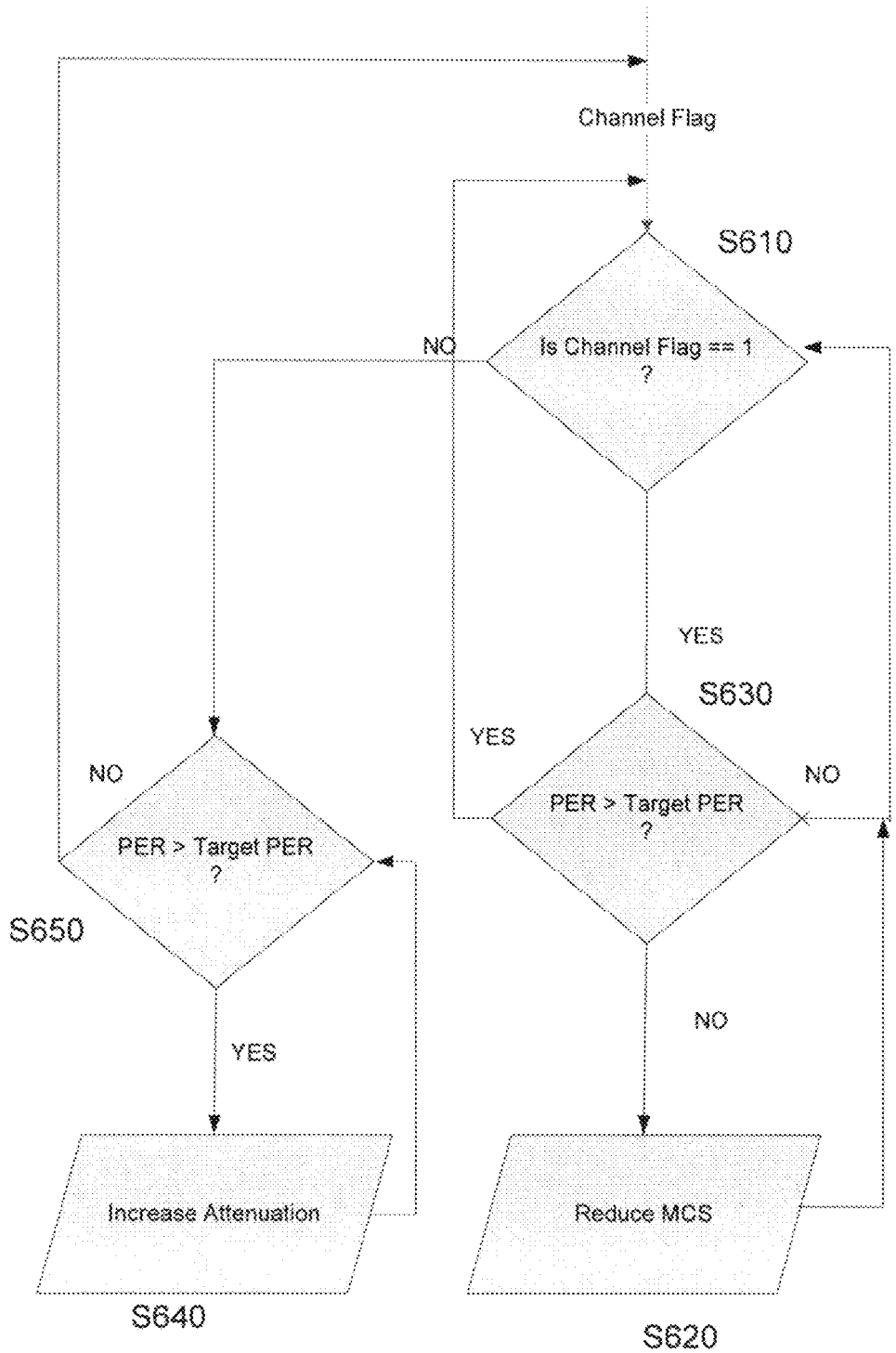

FIGS. 5 and 6 illustrate examples of the method carried out by the controller 110 in more detail.

A radio resource manager periodically receives the PER value from base station. The flow chart in FIGS. 5 and 6 shows the actions taken by the radio resource manager to correct the problem of the increased error rate.

In step S510 the radio resource manager checks if the PER is greater than the target PER (for example 10%). If S510 is true, then in step S520, the radio resource manager then checks if the RSRP_start (which denotes the RSRP value at time t−1) is greater than the current RSRP value by a threshold of 4. The value of this threshold was chosen from practical observations.

If step S520 is true, then it implies that the channel conditions are bad hence the appropriate actions regarding the channel losses need to be taken. Therefore in step S530 Channel Flag is set to 1 to indicate that actions to remedy the channel losses need to be taken.

If step S520 is false, then it implies losses due to interference and appropriate actions need to be taken, in step S540, Channel Flag is set to 0 to indicate that the losses are due to interference. As shown in FIG. 5, if the RSRP is greater than RSRP_Start+4, then the method proceeds to step S540.

The processing following the setting of the Channel Flag is shown in FIG. 6. This is described below following the description of the left hand side of FIG. 5.

If the result of step S510 is false, then if it checked that the MCS and power are not set at low values even when the channel conditions are good and there is no interference.

In step S550 the value of RSRP_slope is checked. This indicates whether the RSRP changed when the method the method was last executed. If step S550 is true, then it is checked whether the MCS is lower than a threshold. If the MCS is lower than the threshold, then the MCS is increased in step S570. The flowchart in FIG. 5 shows a value of 22, this represents a maximum possible MCS value.

If step S550 is false, this indicates that previously, the signal strengths have been attenuated. In step S580, a check of the level of attenuation is carried out. If the attenuation is higher than a threshold, then in step S590, the attenuation is decreased.

In the flowchart shown in FIG. 5, following step S550 and prior to step S560 or S580, a check is made whether the PER is greater than the target PER.

FIG. 6 shows the steps taken following setting Channel Flag. In step S610 the value of Channel Flag is checked. If Channel Flag is 1, this indicates that there are channel losses, then the MCS is reduced in S620. Following reduction of the MCS in step S620, a check is carried out in step S630 if the PER is less than the target PER. If in step S630 the PER is determined not to be less than the target PER, then the method returns to S620 and the MCS is reduced further.

If the Channel Flag is set to 0, this indicates that the change in the PER is due to interference. In step S640 the attenuation is increased. In step S650 it is checked whether the PER is below the target PER and step S640 is repeated until the PER is reduced to below the target PER.

There is a limit on reduction of this power and cannot be lower that a certain threshold. If still conditions do not improve then other radio resource management (RRM) techniques will need to be used to mitigate interference such as choosing another frequency for the user etc. Similarly if the power of both the base stations is such that they do not interfere with each other then a break in the video would represent channel losses and the algorithm will identify this and correct it by reducing the MCS.

When there is no interference or channel conditions stabilise, then as shown in the left hand side the flowchart, the algorithm increases the MCS rate up so that when the channel is good the throughput is not unnecessarily reduced. Likewise if there is no interference present then the attenuation can be reduced to a certain threshold that would increase the coverage of the other base station.

The power control may be applied to a subset of the frequencies. If a certain user is at the cell edge then only power of those frequencies being used by that user can be reduced while the others can be kept high.

As described above, embodiments of the present invention allow a network controller to identify if an interferer is present and thereby establish the reason for the loss in signal. This enables the controller to perform downlink power control or improve the link quality by reducing the Modulation Coding Scheme (MCS) in a scenario such as CoAB or DAB where there is a master unit that controls the network and information is sent to the central unit from the Base stations and UEs (wireless devices) or from a Radio Environment Map (REM) database where external sensors are used to gather the relevant spatial information about the environment.

While certain embodiments have been described, these embodiments have been presented by way of example only, and are not intended to limit the scope of the inventions. Indeed, the novel methods and systems described herein may be embodied in a variety of other forms; furthermore, various omissions substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of managing a wireless network, the wireless network comprising a first base station and a second base station, the method comprising
   detecting an increase in an error rate in a wireless connection between the first base station and a first wireless device;
   comparing a reference signal power received by the first wireless device from the first base station with a received power threshold value, wherein the received power threshold value is dependent upon a value for the reference signal power prior to a wireless connection between the second base station and a second wireless device being established;
   determining that the increase in error rate is due to interference from a wireless connection between the second base station and the second wireless device when the reference signal power is greater than the received power threshold value; and
   reducing signal strength in the network when the increase in error rate is due to interference.

2. A method according to claim 1, further comprising determining that the increase in error rate is due to a change in channel conditions when the reference signal power is less than the received power threshold value.

3. A method according to claim 2, further comprising decreasing a bit rate of the wireless connection between the first base station and the first wireless device when the increase in error rate is due to a change in channel conditions.

4. A method according to claim 1 wherein reducing signal strength in the network comprises reducing the strength of the signals transmitted from the first base station and the second base station.

5. A method according to claim 1, further comprising checking if the error rate in the wireless connection between the first base station and a first wireless device is below a target error rate following reducing the signal strength and further reducing the signal strength when the error rate is not below the target error rate.

6. A method according to claim 2, further comprising checking if the error rate in the wireless connection between the first base station and a first wireless device is below a target error rate following decreasing the bit rate and further decreasing the bit rate when the error rate is not below the target error rate.

7. A computer readable medium carrying computer executable instructions which when executed on a processor cause the processor to execute a method according to claim 1.

8. A wireless network comprising
a first base station operable to connect wirelessly with a first wireless device, the first base station operable to output a reference signal and to receive from the first wireless device an indication of a strength of a reference signal power received at the first wireless device;
a second base station operable to connect wirelessly with a second wireless device;
a controller operable to
detect an increase in an error rate in a wireless connection between the first base station and the first wireless device;
compare an indication of the strength of the reference signal power received at the first wireless device from the first base station with a received power threshold value, wherein the received power threshold value is dependent upon a value for the reference signal power prior to the wireless connection between the second base station and the second wireless device being established;
determine that the increase in error rate is due to interference from a wireless connection between the second base station and the second wireless device when the reference signal power is greater than the received power the threshold value; and
cause the second base station to reduce the power of a transmitted signal when the increase in error rate is due to interference.

9. A wireless network according to claim 8, wherein the controller is operable to determine that the increase in error rate is due to a change in channel conditions when the reference signal power is less than the received power threshold value.

10. A wireless network according to claim 9 wherein the controller is operable to decrease a bit rate of the wireless connection between the first base station and the first mobile device when the increase in error rate is due to a change in channel conditions.

11. A controller for controlling a first base station and a second base station in a wireless network,
the controller configured to
receive from the first base station an indication of an error rate in a signal sent from the first base station to a first wireless device and an indication of a reference signal power received by the first wireless device from the first base station;
determine if the error rate has risen above an error rate threshold;
compare the reference signal power received with a received signal power threshold value, wherein the received power threshold value is dependent upon a value for the reference signal power prior to a wireless connection between the second base station and a second wireless device being established;
when the reference signal power received is greater than the received signal power threshold value determine that the increase in error rate is due to interference from a wireless connection between the second base station and the second wireless device; and
cause at least one of the first base station and the second base station to reduce the power of a transmitted signal when the increase in error rate is due to interference.

12. A controller according to claim 11, further configured to operable to cause the first base station and/or the second base station to reduce the power of a transmitted signal when the increase in error rate is due to interference.

13. A controller according to claim 11, further operable to determine that the increase in error rate is due to a change in channel conditions when the reference signal power is less than the received signal power threshold value.

14. A controller according to claim 13, further operable to decrease a bit rate of the wireless connection between the first base station and the first wireless device when the increase in error rate is due to a change in channel conditions.

15. A controller according to claim 11, further operable to cause the first base station and/or the second base station increase the power of a transmitted signal when the error rate is below the error rate threshold.

16. A controller according to claim 11, further operable to increase a bit rate of the wireless connection between the first base station and the first wireless device when the error rate is below the error rate threshold.

* * * * *